Jan. 12, 1960 S. TARANTUR 2,921,123

COMBINED BURST SEPARATOR AND COLOR KILLER

Filed Jan. 8, 1957 3 Sheets-Sheet 1

INVENTOR.
Sam Tarantur
BY Donald W. Phillion
HIS ATTORNEY

Jan. 12, 1960 S. TARANTUR 2,921,123

COMBINED BURST SEPARATOR AND COLOR KILLER

Filed Jan. 8, 1957 3 Sheets-Sheet 2

INVENTOR.
Sam Tarantur
BY Donald W. Phillion
HIS ATTORNEY

Jan. 12, 1960 S. TARANTUR 2,921,123

COMBINED BURST SEPARATOR AND COLOR KILLER

Filed Jan. 8, 1957 3 Sheets-Sheet 3

INVENTOR.
Sam Tarantur
BY Donald W. Phillion
HIS ATTORNEY 2,921,123

COMBINED BURST SEPARATOR AND COLOR KILLER

Sam Tarantur, River Grove, Ill., assignor to Admiral Corporation, Chicago, Ill., a corporation of Delaware Application January 8, 1957, Serial No. 633,073

6 Claims. (Cl. 178—5.4)

This invention relates, generally, to color television receiver circuits, and more particularly to circuitry employing but a single tube and which is designed to effect both the separation of the color synchronizing signal bursts (also referred to herein as color bursts) from the composite video signal and the production of a "color killer" control voltage for disabling the chrominance circuit when a monochrome signal is being received.

In a simultaneous type color television receiver currently in use the picture information, in a general sense, is supplied to the image reproducing device through two different circuits. One of these circuits, known as the monochrome circuit, functions to supply to the picture tube a signal corresponding to the conventional black and white video signal, while the other circuit, known as the chrominance circuit, functions to derive from the composite video signal the color signals which are also supplied to the picture tube to reproduce the color in the picture. In order to derive the color signals from the composite video signal it is necessary first to derive the color synchronizing signal from information contained in the composite video signal. This is accomplished by a third circuit means referred to herein as a color synchronizing circuit. Derivation of the color synchronizing signal involves the separation of the color bursts from the composite video signal. The color bursts are located on the "back porch" of the composite video signal and having a frequency equal to some odd multiple of half the line frequency. In the prior art, separation of the color bursts is accomplished by a gating circuit which functions to pass only the color bursts. These color bursts are then supplied to circuit means which responds thereto to produce a continuous wave color synchronizing signal of the proper phase and frequency.

Another function of present day color television receivers is the production of a "color killer" voltage signal which is employed when the received signal contains no color information. Under such circumstances, there will be no color bursts present in the composite video signal. To prevent spurious signals from passing through the chrominance circuits and developing noise which will appear as color in the monochrome picture, it is necessary to disable the chrominance circuits. This can be done by cutting off the chroma amplifiers.

In the prior art, at least one tube has been employed to separate the color bursts from the video signal and at least one other tube has been employed to respond to the absence of color bursts to produce the "color killer" signal which will cut off the chroma amplifier.

It is an object of the present invention to perform the functions of separating the color bursts and of producing a "color killer" signal by a circuit employing but a single tube.

Another object of the invention is to provide an inexpensive circuit for separating the color bursts and for producing a "color killer" signal.

A third object of the invention is to provide a reliable circuit for separating the color bursts and for producing a "color killer" signal.

A further object of the invention is the improvement of color television circuits, generally.

In accordance with the invention, there is provided an electron discharge device having a cathode, a control grid, and an anode. Grid leak circuit means, having a relatively long time constant compared to the time duration of a picture line, are provided to supply the composite video signal to said control grid. Means are provided for supplying to the electron discharge device gating pulses which occur at times substantially coincident with the color bursts. The electron discharge device is responsive to these gating pulses to become conductive for the duration thereof. Other means are provided for supplying said gating pulses to said control grid to cause the peak amplitude of the color bursts to exceed the peak amplitude of the horizontal synchronizing pulses. Thus, the bias on the control grid will have two levels in accordance with the absence or presence of the color bursts. Integrating means are provided to integrate the output signal of the electron discharge device to produce one of two D.-C. output signal levels, in accordance with the particular level of bias on the control grid. The level of the D.-C. output signal indicates the presence or the absence of color bursts.

In accordance with a feature of the invention, there can be employed in lieu of the grid leak circuit means, any voltage levelling circuit which will produce on the control grid, a biasing potential whose magnitude varies in accordance with the presence or absence of the color bursts. Further, instead of the electron discharge device, other types of electronic valves, such as a transistor, for example, can be employed.

These and other objects and features of the invention will be more fully understood from the following detailed description thereof when read in conjunction with the drawings, in which.

Figure 1:
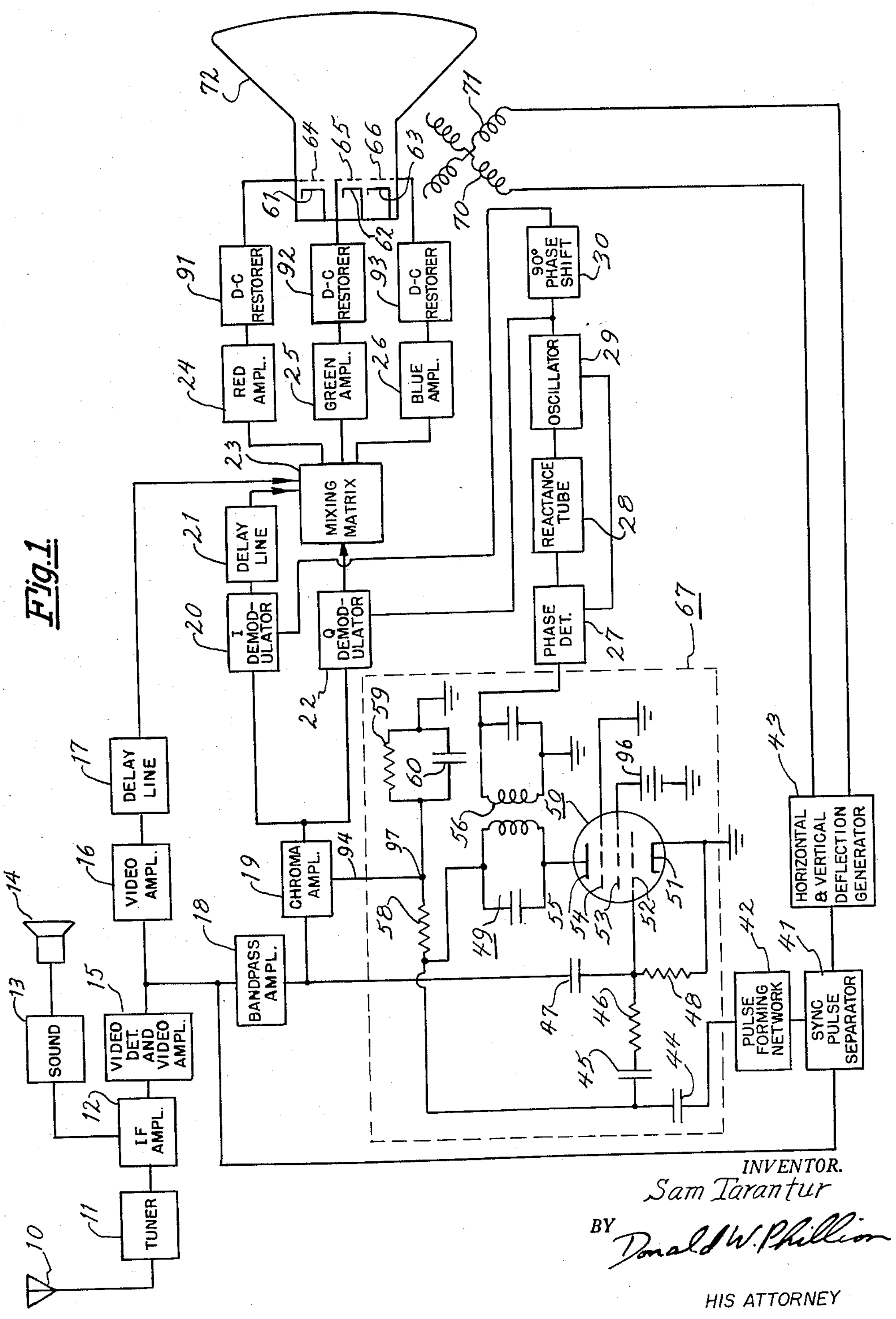
Fig. 1 is a combination block diagram and schematic sketch of the invention.

Referring now to Fig. 1, the block diagram portion thereof is prior art and is included in the specification primarily to illustrate where and how the invention fits into the over-all system.

The invention, which functions to separate the color bursts from the composite video signal and also to produce a "color killer" voltage, is shown in schematic diagram form within the broken line block 67.

The overall system will be discussed first. It is to be understood that such discussion will be general, since it is not a part of the invention, except insofar as gating pulses are derived therefrom. For a more detailed account of the system represented in Fig. 1, reference is made to a publication entitled, "LB–925 R.C.A. Developmental Color Television Receiver" and published by the Radio Corporation of America, RCA Laboratories Division, Industry Service Laboratory. The transmitted television signal is intercepted by the antenna 10, which supplies said signal to the tuner 11 and thence to the intermediate frequency (IF) amplifying section 12. The sound channel 13 responds to the output of the IF amplifying section 12 to derive the audio signal which drives the speaker 14.

The output of the IF section 12 is also supplied to the video second detector and to a stage of video amplification, both of which are included within the block 15. From this point the signal is supplied to the mixing matrix 23 through two different circuit paths, which are as follows: The first path is the luminance or monochrome circuit comprising video amplifier 16 and the delay line 17. The second path is the chrominance circuit including the band-pass amplifier 18, the chroma amplifier 19, the Q demodulating circuit 22, the I demodulating circuit 20, and the delay line 21. The function of the chrominance circuit is to re-obtain the original I and Q voltages, the definitions of which are well known in the art and which are set forth in the RCA publication recited hereinbefore. The I and Q voltages, and the monochrome signal, are supplied to the mixer circuit 23, where the original color signals are re-obtained. The original color signals are then supplied in parallel through the red amplifier 24 and the D.-C. restorer 91, the green amplifier 25 and the D.-C. restorer 92, and the blue amplifier 26 and the D.-C. restorer 93, to the grids 64, 65, and 66, respectively, of the tri-gun kinescope 72, which also contains the three cathodes 61, 62, and 63.

For transmission purposes the color subcarrier signal was removed from the I and Q signals, but must be reinserted before the I and Q signals can be demodulated. To provide a reference signal for the reproduction of this color subcarrier signal is the function of the color bursts. The color bursts are separated from the composite video signal by means of the present invention shown within the block 67, which will be described in more detail later. The separated color bursts are then supplied through a phase detector 27 and a reactance tube 28 to an oscillator 29. The phase and frequency of the output signal of the oscillator 29 are accurately controlled by the phase detector 27 and the reactance tube 28, which function in a well-known manner. More specifically, the output signal of the oscillator 29 and the color burst signal are compared in the phase detector 27 to produce a signal whose amplitude varies as the phase of the two signals varies. The reactance tube 28 is responsive to the output signal of the phase detector to control the phase of the output signal of the oscillator 29. The oscillator output signal is supplied directly to the Q demodulator 22 and to the I demodulator through the 90° phase shift circuit 30.

Under some circumstances the receiver is employed to receive composite video signals representative of black and white images. To prevent these monochrome signals from passing through the chrominance circuit and distorting the reproduced image, it has been found expedient to disable the chrominance circuit during the reception of monochrome signals. This is accomplished by supplying a "color killer" signal to the chroma amplifier 19 through conductor 94 when no color bursts are present. Such a signal also is produced by the structure of the present invention, shown within the block 67.

The horizontal and vertical deflection signal generating circuits comprise the synchronizing signal separator 41 and the deflection signal generating circuits 43. The output signals of block 43 are supplied to the vertical and horizontal windings 70 and 71.

Referring now specifically to the circuitry within the block 67, the composite video signal is supplied from the band-pass amplifier 18 to the control grid 52 of the pentode 50 through the coupling capacitor 47. The pentode 50, which also comprises a cathode 51, a screen grid 53 biased by battery means 96, a grounded suppressor grid 54, and an anode 55, functions as a gate to separate the color synchronizing signal bursts from the applied composite video signal, and further functions to produce a D.-C. output which is utilized as the "color killer" voltage.

Figures 2, 3, 4, 5:
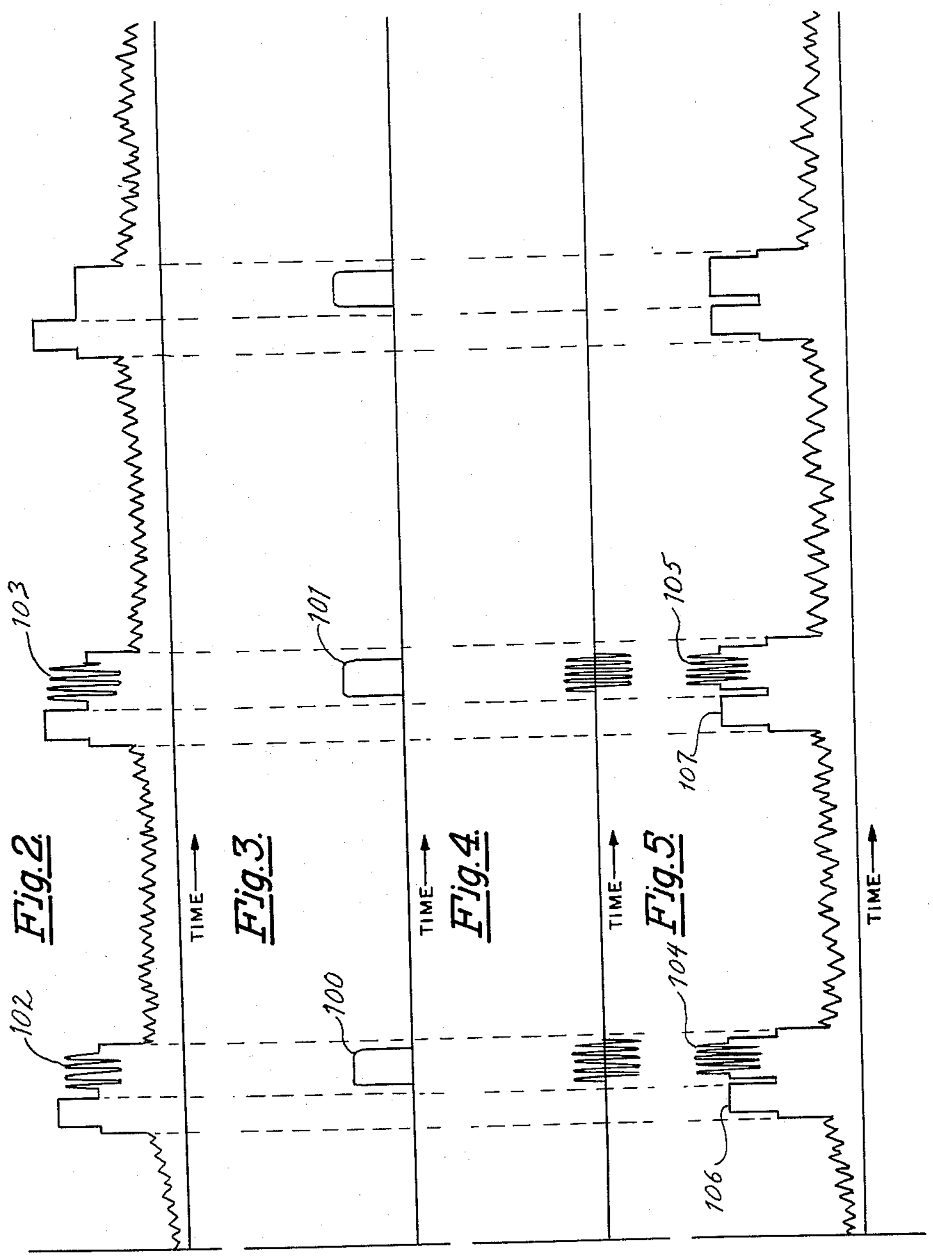
Fig. 2 shows a representative composite video signal containing color bursts.
Fig. 3 is a curve representing the gating pulses.
Fig. 4 is a curve of the separated color bursts.
Fig. 5 represents the sum of the curves of Figs. 2 and 3, and is the signal that is supplied to the control grid of the electron discharge device.

The pulse forming circuit 42 is constructed to be responsive to the horizontal synchronizing pulses to produce gating pulses which are supplied to the anode 55 of the tube 50 through the coupling capacitor 44 and the tuned circuit 49. These gating pulses are represented by the typical pulse waveforms 100 and 101 of Fig. 3 and can be seen to cause the pentode 50 to become conductive substantially during the period of the color burst signals, such as color bursts 102 and 103 shown in the curve of Fig. 2. The tuned circuit 49 is tuned to the frequency of the color synchronizing signal burst. Thus the output signal appearing across the tuned circuit 49 is a periodic burst of signal having the same frequency and the same time duration as the color synchronizing signal bursts supplied to the control grid 52. Fig. 4 shows the output signal of the pentode 50. The winding 56 is inductively coupled to the tuned circuit 49 and functions to supply the output of the pentode 50 through the phase detector 27 and the reactance tube 28 to the oscillator 29, which is constructed to oscillate at a frequency near the frequency of the color synchronizing signal bursts. As discussed hereinbefore, the phase detector 27 and the reactance tube 28 function to lock the phase of the output signal of the oscillator 52 in exact synchronism with that of the color synchronizing signal burst.

In addition to separating the color bursts from the composite video signal, the circuit within the broken line block 67 functions to produce the "color killer" voltage. As stated hereinbefore, the "color killer" voltage is employed, in the absence of color bursts, to cut off the chroma amplifier 19 and thus prevent monochrome signals from being supplied to the picture tube 72 via the chrominance circuit. When the "color killer" voltage is absent, the chroma amplifier will not be cut off and the chrominance circuit will function to supply the color signals to the picture tube. The "color killer" voltage signal is taken from the point 97 between the resistors 58 and 59, which form a voltage divider. It is to be noted that the D.-C. potential at the point 97 need only have two levels; a first level, being the "color killer" voltage, and the second level, being a potential which will not disable the chroma amplifier. These two levels of potential are created in the following manner:

Under ordinary circumstances, the synchronizing pulses which constitute the most positive portion of the applied composite video signal would establish the amount of bias on the control grid 52 of pentode 50 through the action of the grid leak circuit comprising the capacitor 47 and the resistor 48. However, the gating pulse supplied to the anode 55 of pentode 50 is also supplied to the grid 52 through the coupling circuit comprised of capacitor 45 and resistor 46 which, in cooperation with the resistor 48, forms a second grid leak circuit. As indicated before, these gating pulses coincide substantially with the bursts of color synchronizing signal which occur on the "back porch" of each horizontal blanking pulse.

The gating pulses (Fig. 3) and the composite video signal (Fig. 2), when added together, will produce at the grid 52 of tube 50 a resultant signal represented by the waveform of Fig. 5, in which the peak amplitude of the color bursts 104 and 105 exceed the amplitude of the horizontal synchronizing pulses 106 and 107. Thus, the bias on the grid 52 will be determined by the presence or absence of color bursts.

Figure 6:
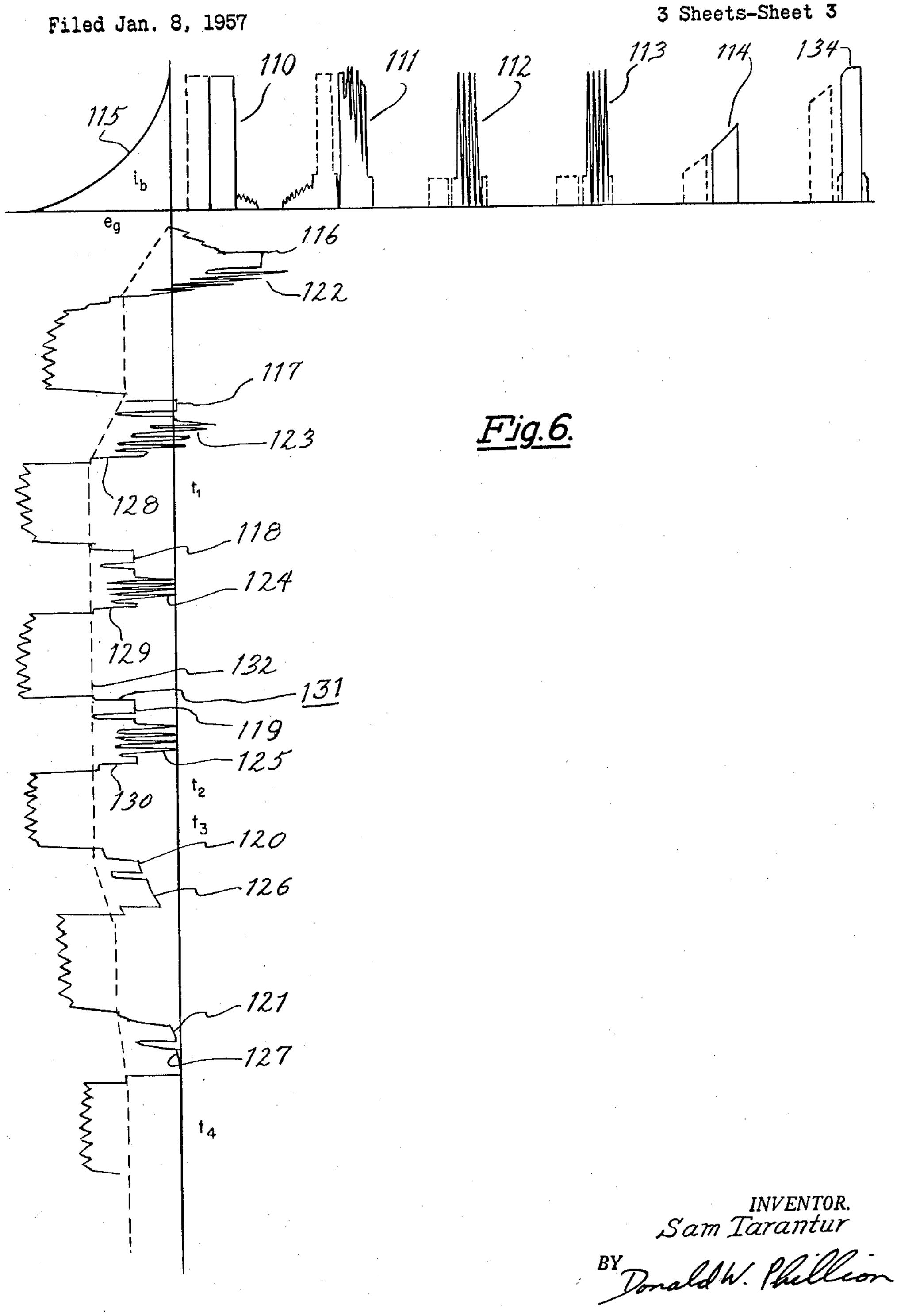
Fig. 6 shows the relationship between the applied composite video color signal, the control grid bias, and the resultant plate current.

In Fig. 6 there is shown a plate current ($i_b$) versus grid potential ($e_g$) curve 115 for the pentode 50 (Fig. 1). The waveform 131 represents a composite signal comprising the composite video signal and the gating signal superimposed thereon, said composite signal being supplied to the grid 52 and covering a time interval including several lines. The portions of the waveform 131, identified by reference characters 116, 117, 118, 119, 120, and 121, represent the horizontal synchronizing pulses, and the burst of signals 122, 123, 124, and 125 represent the color bursts, each of which coincides substantially with a gating pulse, such as gating pulses 128, 129, and 130, which are superimposed upon the composite video signal in manner described hereinbefore. The portions 126 and 127 of the waveform 131 represent the superimposed gating pulses during periods when no color synchronizing signal bursts occur.

Fig. 6 also shows the amount of bias on the grid 52 of pentode 50 (Fig. 1) when a series of color bursts occur, and when there are no color signal bursts for a series of lines. More specifically, assume that a composite video signal having color bursts 122, 123, 124, and 125 therein is supplied to the grid 52 of the pentode 50 of Fig. 1. Because of the action of the grid leak circuit (Fig. 1) which will function to charge the capacitor 47, the tips of the color bursts of the composite video signal applied to the control grid 52 will be levelled off at a potential just slightly more positive than the potential of the cathode 51. Thus, the bias on the control grid 52, which is represented by the broken line 132, will, after an initial few occurrences of the color burst, settle to a value as indicated, for example, between the times $t_1$ and $t_2$. If the color burst should be excluded from the composite video signal, as represented by the curve 132 between the times $t_3$ and $t_4$, the level of the grid bias will increase to a value as indicated at about time $t_4$. It can be seen that the magnitude of the control grid bias at time $t_2$ is considerably greater than the magnitude of the grid bias at time $t_4$. Thus, the value of the plate resistance of the pentode 50 at time $t_2$ will be correspondingly greater than the value of the plate resistance at time $t_4$. Consequently, the average D.-C. potential appearing at the point 97 (Fig. 1) will be higher at time $t_2$ when the color signal bursts are present than when they are not present. The more negative level of the D.-C. signal appearing at point 97 is employed to cut off the chroma amplifier 19, whereas the more positive level will not disable the chroma amplifier. This creation of two D.-C. potential levels at the point 97 will be more clearly understood with reference to the waveforms 110, 111, 112, 113, 114, and 134 of Fig. 6, which represent the output plate current of the pentode 50 that would flow if the pentode 50 were not gated. Only the solid line portions, however, of these waveforms, represent the signals that actually appear in the plate circuit of the pentode 50, since it is only during the corresponding intervals of time that the pentode is caused to become conductive by the gating pulses applied to the plate 55 thereof, as discussed hereinbefore. It is readily apparent that the waveforms 112 and 113, which contain the separated color bursts, have considerably less D.-C. component therein than the waveform 134, which does not contain the separated color burst. Thus, the integration circuit (Fig. 1), which comprises the capacitance 60 and resistors 58 and 59, functions to integrate the output signal of the pentode 50 to produce an average D.-C. potential at the point 97 which is more negative in the absence of color bursts.

It is to be noted that the forms of the invention herein shown and described are but preferred embodiments of the same, and that various changes may be made therein without departing from the spirit or scope of the invention.

I claim:

1. In a color television receiver comprising a chroma channel and constructed to receive a composite video signal and also constructed to receive a composite chroma signal having horizontal synchronizing pulses and color synchronizing signal bursts occurring during the black level following each horizontal synchronizing pulse, means for separating the color synchronizing signal bursts from said composite chroma signal comprising an electron discharge device including a cathode, a control grid, and an anode, means for supplying the composite signal to said control grid, said means constructed to cooperate with the rectifier formed by said control grid and said cathode to level the most positive recycling peak amplitudes of the composite video signal at a potential slightly more positive than the potential of said cathode, means for producing gating pulses which occur during said color synchronizing signal bursts, and means for supplying said gating pulses to said control grid to cause the peak amplitude of said color synchronizing signals to exceed the peak amplitude of said horizontal synchronizing pulses, means for supplying said gating pulses to said anode of said electron discharge device to cause said electron discharge device to become conductive for the duration thereof, and means for separating the D.-C. component from the output signal of the electron discharge device, said chroma channel constructed and arranged to be responsive to the D.-C. component of the output signal of the electron discharge device when a composite video signal is being supplied to said control grid to become non-operative.

2. In a color television receiver comprising a chroma channel, means for separating the color synchronizing signal bursts from an applied composite chroma signal and for creating a "color killer" voltage from an applied composite video signal, said means comprising an electron valve including an anode and a control electrode, voltage levelling means comprising grid leak resistor means connected to said control electrode and capacitor means for supplying said composite signal to said control electrode, means for generating gating pulses which occur during the color synchronizing signal bursts, means for supplying said gating pulses to said control electrode to cause the peak amplitude of the color synchronizing signal bursts to exceed the amplitude of the horizontal synchronizing pulses of the composite chroma signal, means for supplying said gating pulses to said anode to cause said electron valve to become conductive for the duration thereof, means for extracting that portion of the electron valve output derived from the color synchronizing signal bursts, and means for extracting the D.-C. component of the output of said electron valve, said chroma channel constructed and arranged to respond to said D.-C. component when a composite video signal is supplied to said control electrode to become non-operative.

3. Means for separating the color synchronizing signal bursts from the composite chroma signal and for creating a "color killer" voltage in accordance with claim 2, in which said means for extracting from the color synchronizing signal bursts from that portion of the electron valve output derived from the color synchronizing signal burst comprises a tuned circuit arranged in the output circuit of said electron valve.

4. In a television receiver having a chroma channel and adapted to receive a composite video signal and a composite chroma signal, said composite chroma signal including color synchronizing signal bursts occurring during the black level following each horizontal synchronizing pulse, means for separating the color synchronizing signal bursts during reception of said composite chroma signal and for developing a "color killer" voltage to disable said chroma channel during reception of said composite video signal comprising, a normally nonconductive electronic valve, means including said composite signals for establishing a first bias level for said valve when said color synchronizing bursts are present and for establishing a second bias level for said valve when said color synchronizing bursts are absent, means for keying said valve to a conductive state only during the occurrence of said black level portion of said composite signal, the conduction current in said valve having a direct component of a first magnitude and an alternating component, when said color synchronizing bursts are present, and a direct component of a second magnitude when said color synchronizing bursts are absent, means responsive to the alternating component of said conduction current for separating said color synchronizing bursts and means responsive to said second magnitude direct component of said conduction current for developing said "color killer" voltage.

5. In a color television receiver including a chroma channel, means for separating the color synchronizing bursts from an applied composite chroma signal and for developing a "color killer" voltage to disable said chroma channel when a composite video signal is applied comprising, an electronic valve having an input circuit and an output circuit, pulse means for generating voltage pulses at the line frequency of said composite signal, coupling means coupling said composite signal to said input circuit, means for simultaneously applying said voltage pulses to said input circuit and to said output circuit substantially coincident with the occurrence of said color synchronizing bursts on said composite signal, said pulses applied to said output circuit initiating conduction in said valve, said input circuit including means cooperating with the applied input pulses for establishing a first bias level for said valve when said synchronizing color bursts are present and a second bias level when said synchronizing color bursts are absent, and means in said output circuit for separating the alternating component of the conduction current in said valve from the direct component and for developing said "color killer" voltage when said valve is operated at said second bias level.

6. In a color television receiver as set forth in claim 5 wherein said means for developing said "color killer" voltage is responsive to the magnitude of said direct component of conduction current flowing in said valve due to said second bias level.

References Cited in the file of this patent

RCA Model 21–CT–55, Service Data 1954, #T13, November 24, 1954.